Feb. 24, 1953     E. N. NECKEL     2,629,519
SHIRT FOLDER
Filed Sept. 26, 1950     6 Sheets-Sheet 1

FIG.-1

INVENTOR.
EDMUND N. NECKEL
BY
Hyde, Meyer, Baldwin & Doran
ATTORNEYS

INVENTOR.
EDMUND N. NECKEL
BY
Hyde, Meyer, Baldwin & Doran
ATTORNEYS

Feb. 24, 1953   E. N. NECKEL   2,629,519
SHIRT FOLDER
Filed Sept. 26, 1950   6 Sheets-Sheet 3

INVENTOR.
EDMUND N. NECKEL
BY
Hyde, Meyer, Baldwin & Doran
ATTORNEYS

Feb. 24, 1953 — E. N. NECKEL — 2,629,519
SHIRT FOLDER
Filed Sept. 26, 1950 — 6 Sheets-Sheet 4

*INVENTOR.*
EDMUND N. NECKEL
BY
Hyde, Meyer, Baldwin & Doran
ATTORNEYS

Feb. 24, 1953 E. N. NECKEL 2,629,519
SHIRT FOLDER

Filed Sept. 26, 1950 6 Sheets-Sheet 5

FIG.-13

INVENTOR.
EDMUND N. NECKEL
BY
Hyde, Meyer, Baldwin & Doran
ATTORNEYS

INVENTOR.
EDMUND N. NECKEL

Patented Feb. 24, 1953

2,629,519

UNITED STATES PATENT OFFICE 2,629,519

SHIRT FOLDER

Edmund N. Neckel, Cincinnati, Ohio, assignor to The American Laundry Machinery Company, Cincinnati, Ohio, a corporation of Ohio Application September 26, 1950, Serial No. 186,876

19 Claims. (Cl. 223—37)

The invention relates to novel and improved means for automatically folding garments such as shirts and the like.

An object of the invention is to provide novel and improved means for automatically effecting said longitudinal and transverse folds in proper sequence by power means.

A further object of the invention is to provide means whereby longitudinal folding is accomplished by only two folding motions on each side of the shirt. The present invention constitutes an improvement over the invention disclosed in a copending application of George W. Johnson, Serial No. 186,731 filed September 26, 1950. In said co-pending application a novel and improved method of folding a shirt is disclosed whereby the folding operation begins substantially simultaneously from two opposed locations, namely near the cuff ends of the two outstretched sleeves, the operation then progressing inwardly. Means is shown in said co-pending application for accomplishing this purpose comprising a pair of arms extending in opposite directions from spaced hinge points, a folding plate or wing being hinged at the outer end of each arm. The shirt is placed beneath this assembly, button strip down, and arms extended. The cuffs and lower arm portions project outwardly beyond the wings. In the folding sequence the sleeve ends are first turned inwardly and above the respective wings forming a first fold; the wings are then hingedly swung inwardly making a second longitudinal fold on the hinged edge of the wings; the wing-and-arm overlap is finally turned in, on each side in sequence, making the final longitudinal folds after which the shirt is slipped from the device. A transverse S fold for the shirt tails can be made practically at any intermediate point but this transverse fold is not an essential part of the aforesaid Johnson invention. In Johnson's method the various movable elements are described as being operated manually but the particular method as embodied in a series of steps may be performed mechanically.

The present specificatioin discloses a modified method, and the invention comprises novel apparatus for execution of the method. The present method accomplishes a complete longitudinal folding operation by only two folding motions on each side of the shirt, rather than by three motions on each side as disclosed by Johnson in the aforesaid co-pending application. The present invention provides novel automatic power means for executing said longitudinal folding operation. Further, the present invention provides automatic power means for executing the transverse tail fold, arranged to be operated in a pre-arranged sequence with the longitudinal folds, so that the complete shirt folding operation is automatic from start to finish.

In the drawings illustrating an embodiment of the novel means whereby the steps of the method are executed.

Figure 1:
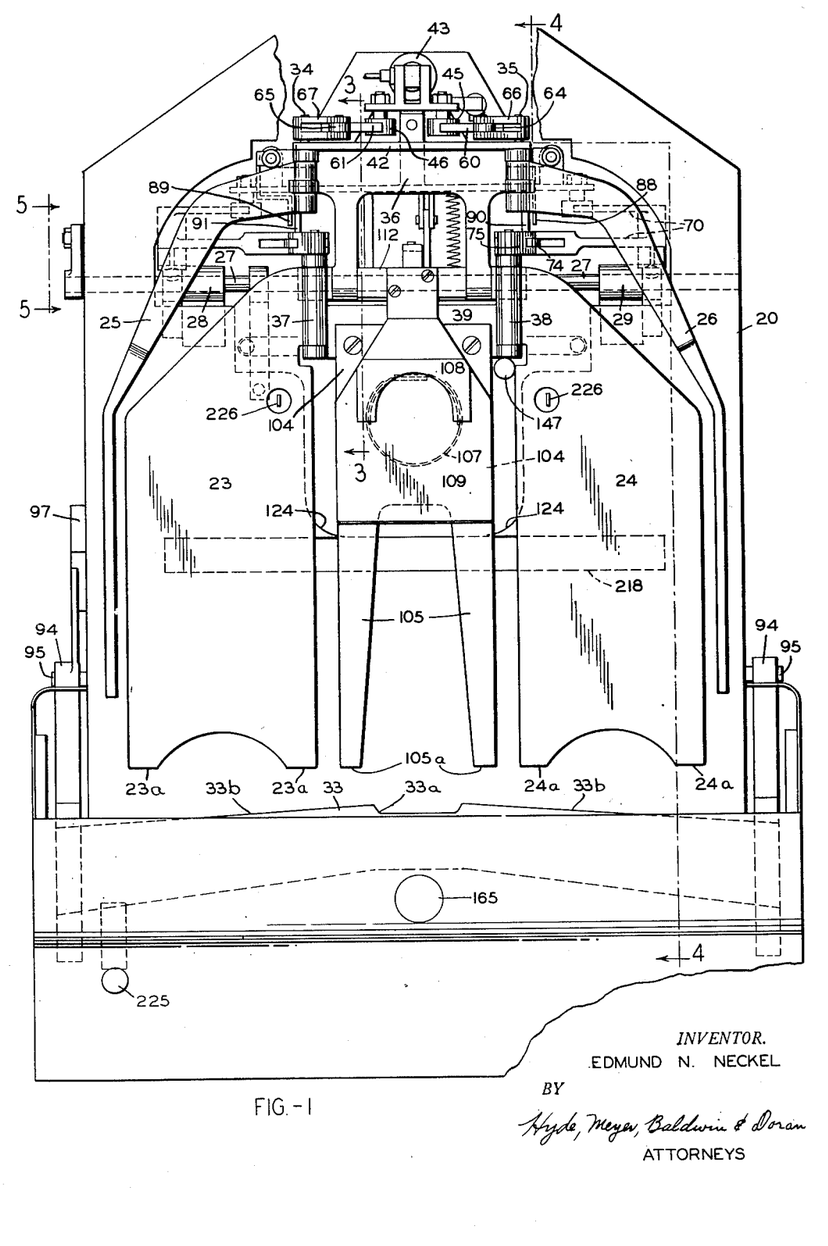
Fig. 1 is a plan view of the folding table top, and the folding wings and folding arms, some parts being broken away to reveal structure therebelow.
Figure 2:
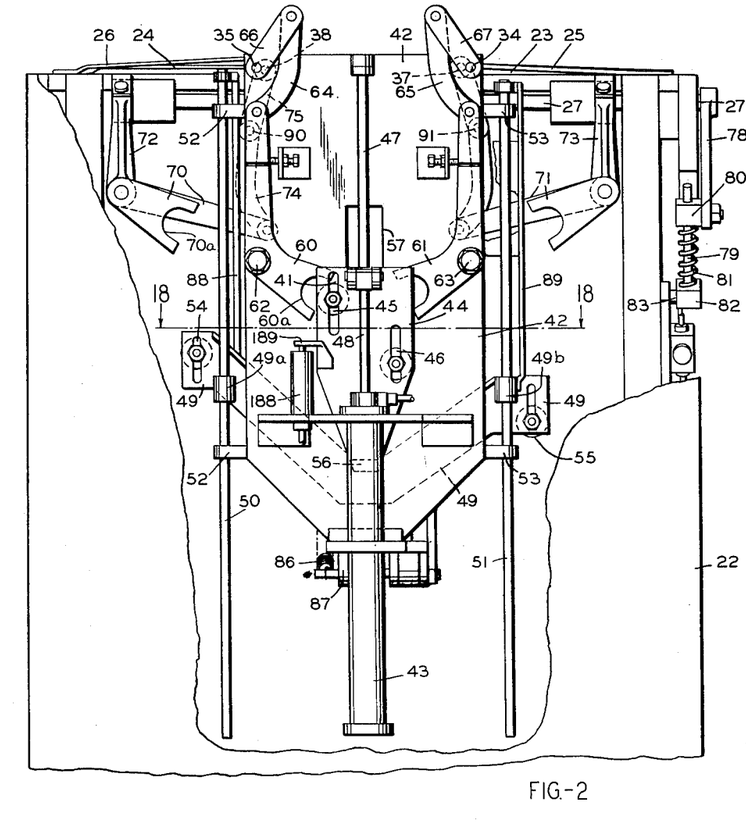
Fig. 2 is a rear elevational view of the folding table, housing parts being broken away, and certain background parts being deleted, for clarity, as viewed from the location of the dot-dash line 2—2 of Fig. 4.
Figure 3:
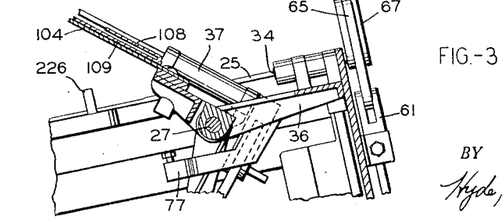
Figs. 3, 4, and 5 are sectional views taken respectively on the lines 3—3, 4—4, and 5—5 of Fig. 1.
Figure 4:
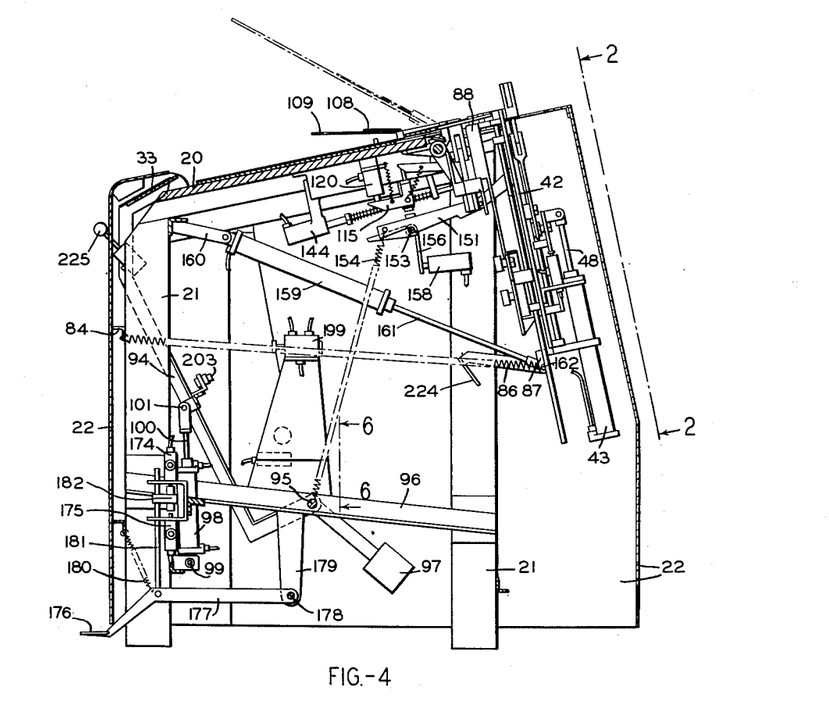

Speaking first generally, Figs. 1, 2 and 4 show a shirt folding machine comprising a layout table 20 supported on legs 21. Front, side, and rear housing walls 22 enclose much of the operating leverages and fluid power motors, later to be described.

The folding elements which directly contact the shirt, and, by their co-action, accomplish the longitudinal folds, consist of a pair of wings 23 and 24, and a pair of arms 25 and 26 (Fig. 1).

The wings and arms are independently mounted, and are independently operatable and controllable for tilting movement around a common axis consisting, as will appear, of a shaft 27 which is rotatable in bearings 28 and 29 fixed with respect to the frame. The purpose of this tilting movement is to bring the arms and wings into and out of folding juxtaposition with the shirt. Said wings and arms are also independently operatable and controllable for swinging movement on individual axes substantially parallel to each other and all at right angles to said axis of tilt. The purpose of the swinging movement is to effect the folding operation after the tilting movement has placed the folding elements in operating position, as will appear. For convenience in general reference, the wings 23 and 24, and the arms 25 and 26, when occasionally referred to herein as a group, will be termed "folding elements."

Figure 8:
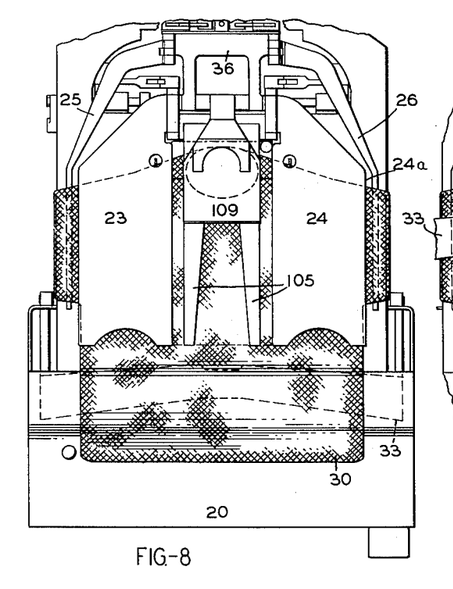
Figs. 8, 9, 10 and 11 are plan views of successive steps in the folding of a shirt by means of the present method and apparatus.
Figure 9:
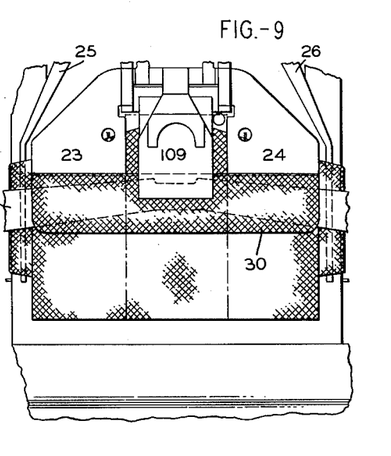

Referring now to Figs. 1, 8, 9, 10, and 11, the folds are accomplished by the following sequential movements. A shirt 30 is laid on the table, under wings 23 and 24, with the sleeves extended and overlying folding arms 25 and 26. This position is shown in Fig. 8, the shirt tails being draped forwardly (towards the operator) and downwardly over a transverse folding blade 33. Blade 33 is first swung upwardly and rearwardly (clockwise in Fig. 4) to tuck the shirt tails into a Z fold as shown in Fig. 9, whereupon the blade 33 is retracted. The transverse fold is thus accomplished by a single stroke of the blade 33. The arms 26 and 25 then are swung inwardly, in the order named, to reach the crossed positions shown in Fig. 10. Finally the wings 24 and 23 swing inwardly, also in the order named, whereupon the folding is completed, the result being shown in Fig. 11.

Figures 10, 11:
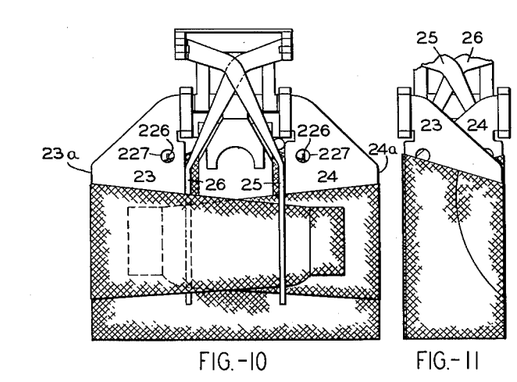
Figure 12:
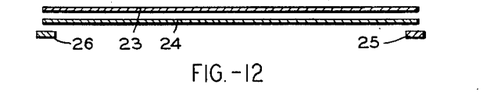
Fig. 12 is a longitudinal sectional view through a folding assembly comprising a set of two folding wings and two folding arms when in completely folded relationship.

Attention is directed to the fact that there is no central means, such as the formerly used "folding plate" around which the longitudinal folding is accomplished. The first longitudinal fold is executed around the outer edge 24a of wing 24 (Fig. 10). The second longitudinal fold is executed around the outer edge 23a of wing 23. The third longitudinal fold is made around arm 25. The fourth longitudinal fold is made around wing edge 24a and arm 26. This sequence is desirable since, if wing 24 were not swung inwardly over the top sleeve (Fig. 10) the sleeve would probably be wrinkled because arm 26 is under it, and not over it.

The means whereby the folding elements are operated will now be described.

Folding arms 25 and 26 are arranged for swinging movement on respective hinges 34 and 35 supported along the opposed edge portions of an arm-supporting member 36 which in turn is pivotally tiltable freely on shaft 27. Wings 23 and 24 are arranged for swinging movement on respective hinges 37 and 38 which are carried by a wing-supporting member 39 secured to shaft 27 for tilting movement as the shaft is rotated. Arm supporting member 36 is fixed to a mounting plate 42 (Figs. 1 to 4) which carries a fluid power cylinder 43, and related mechanism for swinging the folding elements.

Swinging movement of said folding elements is effected through independent leverage systems by means of respectively independent actuating means, as follows.

Figures 16, 17, 18:
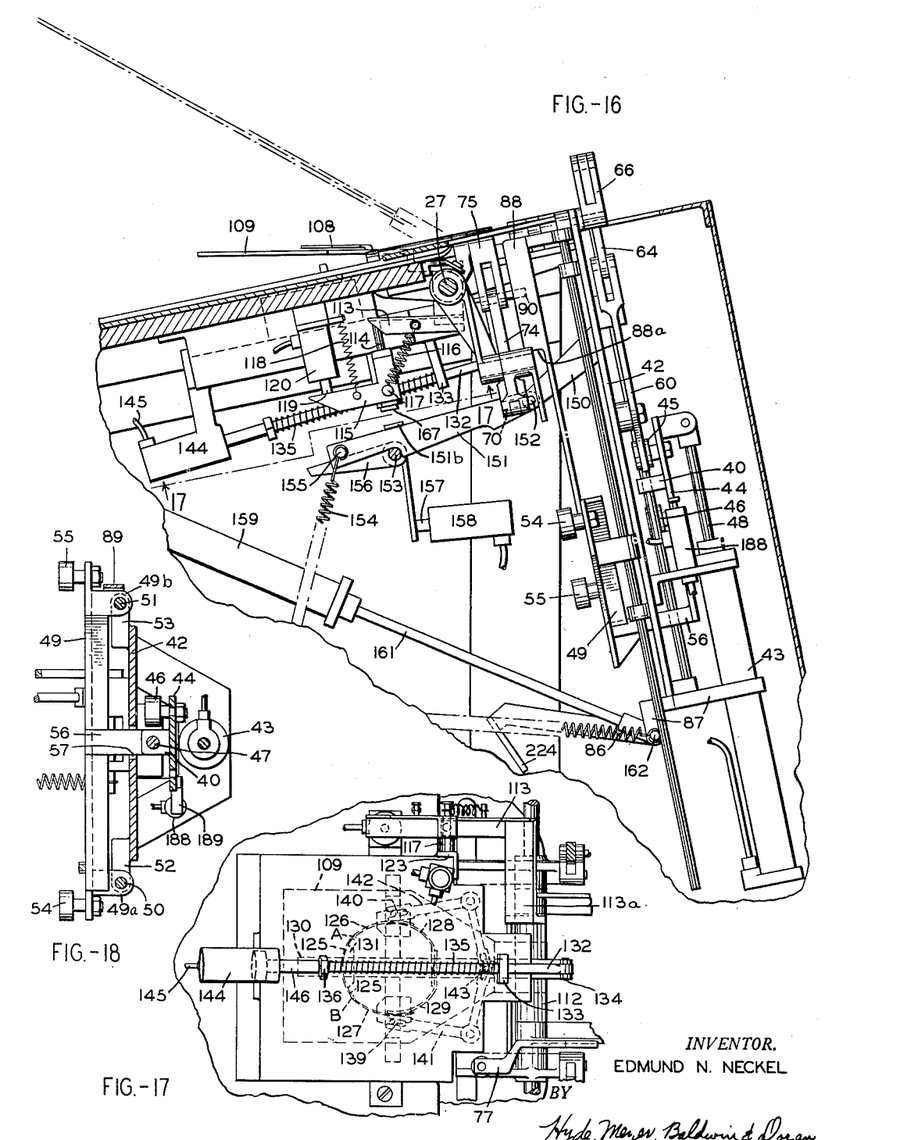
Fig. 16 is fragmentary view showing in enlarged form a portion of the detail illustrated in Fig. 4.
Fig. 17 is a sectional view, taken on the line 17—17 of Fig. 16.
Fig. 18 is a sectional view taken on the line 18—18 of Fig. 2.

On the rearward side of plate 42 (right side in Figs. 4 and 16) is a rear roller carrier 44 upon which a pair of rollers 45 and 46 are adjustably fixed for limited vertical adjustment in slots 41. Roller carrier 44 is vertically reciprocable on a guide rod 47, the carrier having a lug 40 which is pierced to slide on the rod 47 (Fig. 16). One end of a piston rod 48 is attached to a piston in cylinder 43, and the other end to roller carrier 44. On the other side of plate 42 (left side, Figs. 4 and 16) is a front roller carrier 49. It is vertically reciprocable with rear roller carrier 44, since both carriers are fixedly united by means of a lug 56 which extends through an elongated slot 57 in mounting plate 42, and which also slides on rod 47. The front roller carrier has attached thereto, at 49a and 49b, a pair of guide rods 50 and 51 which are vertically slidable in respective sets of fixed lugs 52 and 53. Front roller carrier 49 carries thereon a pair of rollers 54 and 55 which may be vertically adjusted within limits exactly as described with respect to rollers 45 and 46.

It will be apparent that if fluid power is admitted to cylinder 43 so as to move piston rod 48 up or down, corresponding movement will be imparted to the roller carriers 44 and 49. It may be further noted, for future reference, that the individual rolls of the pair 45, 46 and also of the pair 54, 55 are at different heights on their respective carriers.

The mechanism for swinging the folding elements responsive to movement of the roller carriers is as follows.

A pair of bell crank members 60 and 61 are respectively pivotally mounted on pivot studs 62 and 63 on opposed edges of mounting plate 42. Members 60 and 61 are respectively pivotally connected to links 64 and 65. These in turn are pivotally connected to crank arms 66 and 67 which are fixed to rotate respectively with folding arms 26 and 25 by means of hinge pins 35 and 34 fixed to said crank arms and folding arms, and previously referred to herein. The hinges are fixed along opposed lateral edges of the arm supporting plate member 36. Bell crank 60 has a semi-circular cut-out face 60a which is contacted by roller 45 when roller carrier 44 is swung upwardly, whereby to swing the bell crank 60 counterclockwise (Fig. 2), and to swing arm 26 clockwise. The roller may clear the bell crank cut-out on continued upward motion, and on return motion of roller carrier 44 the operation is reversed. A like result is produced by the functional cooperation of roller 46 with bell crank 61, but at a slightly later fractional portion of a second in the cycle, by reason of the variation in vertical position of the two rollers. This means of course that, as shown, arm 26 will fold inwardly just before arm 25, and will also unfold outwardly after arm 25.

For operation of wings 23 and 24 I provide a leverage system comprising a pair of bell crank levers 70 and 71 pivotally carried, respectively, on brackets 72 and 73 fixed to shaft 27. The operation of one wing only will be described since both operate similarly. Crank lever 70 has pivotally connected thereto a link 74, which in turn is pivotally connected to a crank arm 75 attached to a hinge pin in hinge 38. The hinge pin is fixed to wing 24. From what has previously been said it will appear that when front roller carrier 49 is moved upwardly (Fig. 2) the roller 54 will engage the cut-out surface 70a on one crank of the lever 70 so as to operate the leverage just described in this paragraph whereby to fold wing 24 inwardly clockwise (Fig. 2). Again, wing 24 will slightly precede wing 23 on folding movement, and follow wing 23 on unfolding movement by reason of the relative heights of the rollers 54 and 55.

From the description so far it will be apparent that the wing assemblies with their supporting member 39, and their operating leverage 70, 71, 72, and 73 tilt with shaft 27, while the arm assemblies with their supporting member 36, their operating leverages 60, 61, 64, 65, 66, and 67, and mounting plate 42, are free to tilt around, but independently of, shaft 27. However, there is an extending abutment 77 (Figs. 3 and 17) on member 36 which is adapted to contact the under side of member 39, so that if the arm assembly is tilted, it raises the wing assembly with it, but the wing assembly can be tilted while the arm assembly is still resting on the table top.

Figure 5:
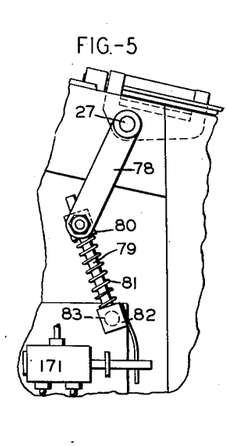

The shaft 27 extends through the side wall 22 of the frame (Figs. 2 and 5), and its protruding end is fixed to one arm 78 of a toggle linkage, the other arm 79 of which extends freely through a hole in a slide block 80 rotatably connected to arm 78. A spring 81 is in compression between block 80 and another block 82 at the fixed pivot point 83 of arm 79. This is a spring biased, over-center toggle with two normal repose positions corresponding respectively to a condition when the wing assembly is tilted up (full line, Fig. 3) and down at table level (Fig. 1).

The folding arms 25 and 26 with associated operating leverages, and with mounting plate 42 are biased towards up-tilted position by a spring 86 fixed at one end to a bracket 87 at the bottom end of plate 42 (Figs. 2, 4, and 16) and at the other end to an angle member 84 bridging the legs of the frame. As will appear the mounting plate may be latched against spring bias in a position wherein the arms are down on the table.

To insure that wings 23 and 24 will not be prematurely moved when folding is in progress requiring timed functional relationships of the whole folding assembly, an interlock is provided in the form of narrow plates 88 and 89 (Figs. 1, 2, 4, and 16) attached to the roller carrier 49 and of course movable vertically therewith. Adjacent to the plates 88 and 89 are pins 90 and 91 respectively serving as the pivotal axes between the links and the crank arms of the leverages for the folding wings. Obviously pins 90 and 91 cannot swing past plates 88 and 89 until the cut-away portions of said plates (shown at 88a for plate 88 and pin 90, Fig. 16) ascend past the pin position, at which time folding movement of the arms is completed.

The construction of the tail folding mechanism will now be described.

The shirt tail is folded upwardly and inwardly (Figs. 1, 8 and 9) or clockwise to the right (Fig. 4) by means of the blade 33 previously mentioned. The blade is carried by side members 94 which are secured to a shaft 95, the latter being journaled in the frame cross brace 96. A counterweight 97 assures quick and effortless swing of the folder blade, the power being provided by an air motor 98 supported on the frame at 99 and having a connecting rod 100 connected to a folder cross brace at 101. The blade has a notched edge portion 33a which straddles and clears the button strip of a shirt to prevent the blade from catching on the buttons. The rearward inclinations 33b of the blade's leading edge (Fig. 1) are based on experience in the art, since, when the blade's forward folding progress is arrested at the center, as will appear, the momentum of the side portions of the shirt tail tends to carry them forward past the center portion, and it has been found that an inclination such as indicated in Fig. 1 results in a fairly straight transverse fold line, though, as will also appear, an effective fold line control is secured by means of the front edge portions 23a and 24a of the wings 23 and 24, and otherwise.

Cooperating with the tail folding blade is the following mechanism. Wing supporting member 39 has secured thereto a thin plate 104 bifurcated at its front end to provide legs 105. The purpose of these legs is to furnish front edge tips 105a (Fig. 1) to afford support for a cardboard which normally overlies the legs, since without the legs the cardboard might buckle. The plate 104 is bifurcated to afford a view of the collar block 107, the structure and operation of which will be later described. The plate 104 serves no function in the longitudinal folding operation since the folds are effected around the arms and wings, and a perfectly satisfactory longitudinal folding operation can be made without either plate 104 or a cardboard insert. When used, the cardboard is inserted over the shirt, and under a hold down plate 108 on a holder 109, the latter assembly tilting upwardly and downwardly freely on shaft 27, but controllable as will be later described. The cardboard might even be laid on the shirt with the end farthest from the operator substantially in contact with the collar. It can serve as a stiffener after the folding operation. The width of the cardboard should be about equal to the distance between the inner edges of wings 23 and 24.

The plate holds the folded shirt tail and prevents the tail from being retracted or disarranged when the tail folder returns to idle position. Its operation will now be described.

Prior to the folding operation plate 109 is inclined upwardly as shown in Figs. 4 and 16. When blade 33 sweeps the shirt tail beneath plate 109, the control system causes the plate to snap downwardly. The plate is secured to a bearing 112 which is free on shaft 27. A leg 113 on bearing 112 extends downwardly and forwardly (Fig. 16), and when plate 109 is elevated said leg rests upon a stud 114 on a bell crank 115, the leg being biased downwardly by a spring 116 attached to the leg and to a fixed pivot point 117. Bell crank 115 is in the position best shown in Fig. 16, when the plate 109 is elevated, but is biased clockwise by a spring 118 against a plunger or connecting rod 119 of a power cylinder 120. When cylinder 120 is energized by admission of pressure fluid thereto, it pushes bell crank 115 counterclockwise, clearing stud 114 from under leg 113, which is thereupon swung counterclockwise, so as to snap down plate 109. The sequence of events will be further correlated later with other operations in the description of the entire operation hereinbelow.

Fig. 17 shows in somewhat greater detail the mechanism described in the last preceding paragraph. The leg 113 has a laterally extending portion 113a extending under adjacent elements on the shaft 10 and suspended from bearing 112. The tripper bell crank 115 is pivotally mounted on the stud 117 secured to an angle bracket 123.

The collar block assembly 107 (Fig. 1) is shown in somewhat greater detail in Figs. 16 and 17. It is recessed in a cut-out 124 in the table and it comprises an expandible and contractable ring made up of five resilient metal segments 125, 126, 127, 128, and 129. Segments 126 and 127 are jointed to segment 125 at A and B respectively. Segments 128 and 129 have a sliding overlap with segments 126 and 127 respectively, and also with each other. A slide bar 130 is fixed to a block 131 attached to segment 125. The slide bar 130 is laterally slidable within the casing, and has a pivotal connection with an operating rod 132 at 134. The bar 130 moves laterally within the casing generally parallel to rod 132 beneath the casing. The bar and rod assembly being biased towards the left (Figs. 16 and 17) by a spring 135 which is compressed between bracket 133 and a nut 136 fixed on rod 132. When moving to the left under spring bias the collar block is being expanded in a longitudinal direction. Expansion in a lateral direction at right angles to rod 132 is effected by the following means. Segments 128 and 129 are each connected to a respective one of a pair of lateral slides 139 and 140 which in turn are operated by forked ends of bell crank toggle members 141 and 142 which have an operating connection with the slide bar 130 at 143. Therefore movement of slide rod 130 to the left moves segments 128 and 129 laterally apart simultaneously with longitudinal expansion.

Operation of the collar block is responsive to the presence or absence of fluid pressure in a fluid power cylinder 144. Admission of such fluid power through pipe 145 moves plunger 146 to the right, compressing spring 135 and contracting the collar block. This is the normal position when power is on, but the shirt collar need not be gripped. When the block needs to be expanded the operator presses an air control button 147 (Fig. 1) exhausting cylinder 144 and permitting the spring to expand the block.

The main carriage assembly, including the mounting plate 42 and the elements attached to or carried by said plate, is provided with latch means for holding the assembly in the position shown in full line in Figs. 4 and 16, and with further means for releasing said latch means and for swinging said assembly to such position that the folding elements are uptilted as shown in broken line in said Figs. 4 and 16. A lug 150 (Fig. 16) is attached to plate 42, and a latch bar 151 is pivotally attached to the lug at 152. The bar is notched to catch on a frame cross rod 153, to which position it is biased by a spring 154, one end of which is attached to frame brace 96 and the other end to a pin 155 in the latch bar. Pin 155 extends beyond the latch bar, and overlies one arm of the bell crank lever 156 which is freely swingable on rod 153, the other arm of said lever 156 abutting a plunger 157 in a fluid power cylinder 158 fixed with respect to the frame. It will be apparent that when fluid power is admitted to cylinder 158 the plunger 157 swings lever 156 clockwise so as to dislodge latch bar 151 from its retainer 153, whereupon the carriage comes under the biasing control of spring 86 previously described. A fluid power cylinder 159 is pivotally attached to a bracket 160 on the frame and operates a connecting rod or plunger 161 pivoted to the carriage assembly at 162. When cylinder 159 is energized, its plunger swings the carriage assembly counterclockwise to the position shown in Figs. 4 and 16, in which position the carriage assembly latches with the folding arms down on the table.

Proceeding now to a description of one cycle in the actual folding operation it may be helpful first to outline the sequence of events.

In starting the wings 23, 24 and the plates 104 and 109 are tilted upwardly, but the arms 25, 26 are flat on the table. The operator places a shirt, front down, on the table, being assisted in centering it by a light 165. The tail drapes over the front and the shirt sleeves hang over respective arms 25 and 26. He places the collar on the collar block and expands the block. He then presses the wings downwardly on the shirt. As will appear in the more specific description of the interrelated controls, this operates the tail folder which works in conjunction with members 108 and 109 to fold the tail. The return of the tail folding blade operates valve mechanism to admit air to the main cylinder 43 which thereupon operates, in sequence, the folding arms 25 and 26 and the folding wings 23 and 24. The operator steps on a treadle and contracts the collar block, releasing the collar. The folding assembly and plates 104 and 109, all enwrapped in the shirt, are now automatically swung upwardly after which the folded shirt is slipped from the assembly. The operator takes his foot off the treadle and the arms are now swung backwardly onto the table, after which the cycle has been completed.

The steps just described are controlled, for the most part automatically, as follows.

Figure 13:
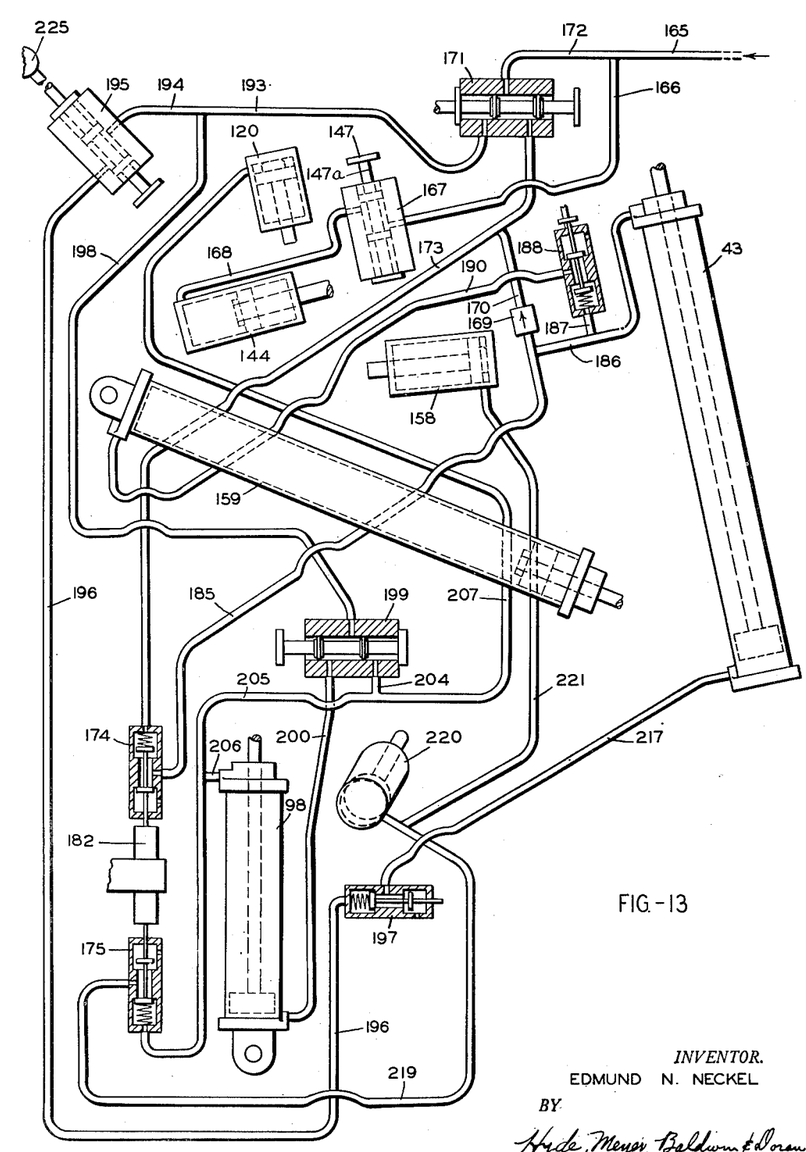
Fig. 13 is a diagrammatic view showing the fluid power circuits and controls.

Referring to Fig. 13, when the operator has dressed the shirt on the table (wings 23 and 24 and plates 104 and 109 being uptilted) with the sleeves overhanging arms 25 and 26, and with the shirt collar on the collar block, he presses air valve button 147 which shuts off the air pressure previously effective on cylinder 144 through pipes 165 and 166, valve 167 and pipe 168. Exhaust of cylinder 144 backwardly through pipe 168 and past plunger 147a permits spring 135 to expand the collar block.

The operator now institutes an automatic sequence of events by pressing down wings 23, 24 while leaving plates 104 and 109 elevated. The over center toggle (Fig. 5) which held the wings in elevated position has adjacent thereto a slide valve 171 which remains in either closed or open position as operated. With wings elevated this valve is in the position shown in Fig. 13. In such position air is admitted through pipes 165 and 172, valve 171 and pipe 173 to the inlet of a conventional combination valve 174 (Figs. 8, 4 and 13). This valve, or an opposed, similar valve 175, is operable by a foot treadle 176 on a lever 177 pivoted at 178 on a bracket 179 on the frame member 96, the lever being biased to upper position by a spring 180 attached at one end to the lever and at the other end to the frame. Spring bias normally maintains valve 174 open as a result of upward pressure of the treadle effective through a rod 181 carrying an actuator 182 which contacts the operating plunger of either valve 174 or valve 175 depending on treadle position. When the treadle is not depressed, therefore, air proceeds through valve 174, pipes 185 and 186 to the upper end of main cylinder 43 thereby keeping its piston and the piston rod 48 down, so as to hold the folding members in unfolded position. Air also goes through pipe 187 to the inlet end of a combination valve 188 (Figs. 2, 13 and 16) which is held open by a finger 189 on roller carrier 44, permitting air to continue to cylinder 159 through pipe 190, which thereby holds the main carriage group including mounting plate 42 and folding arms 25 and 26 in the position shown in Fig. 4, the arms being down on the table. The latch bar 70 cooperates to hold said main carriage as previously indicated.

At the same time the source of compressed air is connected by pipe 166 to the collar block control valve 167.

Having operated valve 167 to grip the collar, as hereinabove described, and having lowered wings 23 and 24, the toggle 78, 79 (Fig. 5) depresses the operating plunger of valve 171 which permits air to flow from pipes 165 and 172 through valve 171 to pipes 193 and 194, slide valve 195 (ordinarily as shown in Fig. 13) pipe 196 to the inlet of combination valve 197 which at the moment is closed. Also, operation of valve 171 has admitted air through pipe 198 to slide valve 199 and through this to pipe 200 in the bottom of cylinder 98 which operates the tail folding blade.

At the height of its stroke the tail folding contactor 203 (Fig. 4) strikes the plunger of valve 199, moving it to the right so as to cut off air flow to the bottom of cylinder 98 (the tail folding power source) and introduces air through pipes 204, 205 and 206 to the top of cylinder 98 to return the tail folder to idle position. Simultaneously air proceeds through pipe 207 to trip cylinder 120 which permits the hold down plate 109 to snap down (Fig. 16) so as to hold the folded shirt tail.

Figure 6:
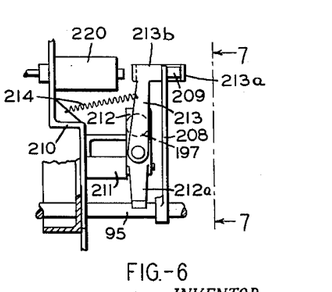
Fig. 6 is a sectional view taken on the line 6—6 of Fig. 4.
Figure 7:
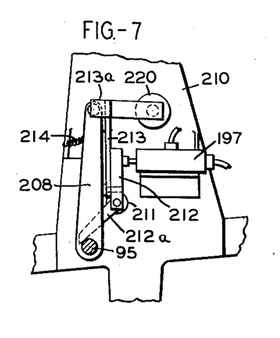
Fig. 7 is a view taken on the line 7—7 of Fig. 6.

Reference should now be had to Figs. 4, 6 and 7. Rod 95 on which the tail folder pivots has fixed thereto an upwardly extending arm 208 carrying an abutment roller 209 at its upper end. A frame bracket 210 carries a stud 211 which pivotally supports an arm 212. The arm 212 has a lower finger 212a abuttable against rod 95. Arm 212 has another arm 213 pivotally attached to it, said arm 213 having at its upper end a cross piece 213b at the end of which is a finger 213a. As shown in Figs. 6 and 7 the cross piece is in abutment with roller 209, but, if arm 213 is permitted to be moved to the left (Fig. 6) by spring 214 as will later develop upon movement of arm 208 to the left (Fig. 7) then finger 213a can be in edge abutment with roller 209.

Return of the tail folder, with its shaft 95 swinging clockwise (Fig. 7) causes arm 208 to urge roller 209 against the edge of finger 213a which assumes intercepting position under the bias of spring 214 whenever the arm is moved counterclockwise (Fig. 7) by folding swing of shaft 95. The finger 213a, with levers 213 and 212, moves to the right depressing the plunger of valve 197 so as to admit air through pipe 217 to the lower end of main cylinder 43. The top of main cylinder 43 has been open to exhaust by way of pipe 186, check valve 169, pipe 170, pipe 173, and out through valve 171 which has been moved to the left. The piston 48 therefore is moved upwardly so as to cause folding arms 25 and 26 and wings 23 and 24 to complete their folding operation.

The operator now lifts the ends of a securing strip from a stack in receptacle 218 (Fig. 1) and secures it around the shirt. The folded shirt is ready for removal from the folding assembly and for this purpose the collar block must release the collar, and the folding assembly must be elevated.

The operator now steps on treadle 176 whereby to close valve 174 and open valve 175. Opening of valve 175 admits air through pipe 219 to tripper cylinder 220 (Fig. 13) so as to push finger 213a out of the plane of roller 209 (Figs. 6 and 7) so that arms 212 and 213 can move slightly to the left (Fig 7) permitting valve 197 to close. At the same time air goes through pipe 221 to tripper cylinder 158 (Fig 4) which unlatches the carriage latch so that the abutment 151b rises with latch bar 151 and contacts the plunger of valve 167, permitting air to flow to collar block control cylinder 144, and to release the shirt collar.

The carriage and wings 23 and 24 swing up together under the bias of spring 86. Previously, downward movement of wings 23 and 24 moved the plunger of valve 171 to the left (Fig. 13) so as to cut off the air to cylinder 159. As the carriage swings clockwise (Fig. 4) a striker 224 on the carriage contacts the plunger of valve 199, returning it to normal position. This cuts off air to tripper cylinder 120, and bell crank 115 returns to abutting position to support the hold down plate arm 113 in uptilted position for the next cycle of operation. Operation of this valve 199 cuts off air to the top of the tail folding cylinder 98 and to the tripper cylinders 220 and 158. Communication is again set up to the bottom of tail folder cylinder 98 but air is simultaneously cut off at valve 171 since this valve was reversed by the toggle arms upon raising of the folding wings. The shirt may now be slipped off the folding assembly. The operator's foot is still on the treadle since the series of operations which has taken so long to describe actually is completed in only a fraction of a second while the treadle is depressed.

After removal of the shirt the operator takes his foot off the treadle. The wings being elevated, valve 171 is open which permits air to pass through said valve, pipe 173, valve 174 again open, pipes 185 and 186 to the top of power cylinder 43, unfolding the arms 25 and 26 and the wings 23 and 24. Air also flows through pipe 187 to valve 188, and, when the roller plate 44 reaches bottom position, the finger 189 opens valve 188 admitting air to pipe 190 to energize cylinder 159 and swing the carriage back counterclockwise (Fig. 4) so that latch bar 151 catches. Arms 25 and 26 are also lowered to the table. Wings 23 and 24 remain elevated, placing all parts in the position in which they were at the start of the cycle.

In the operations so far described nothing much has been said about the utility or function of the valve 195, and it normally is not used, being left in the position shown in Fig. 13. It comes into active use where a pause is desired in the automatic sequence of operations previously outlined, such as in the folding of a shirt with French cuffs. The valve 195 may be operated by a knob 225 (Figs. 1 and 4).

Figure 14:
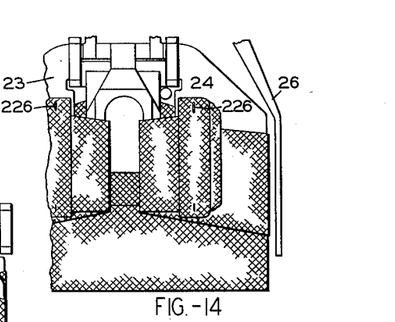
Figs. 14 and 15 are fragmentary plan views showing two methods of folding French cuffs.
Figure 15:
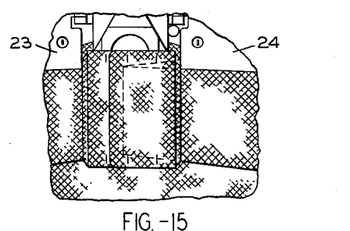

With the shirt laid out upon starting in the usual way the operator pulls knob 225 and then presses down wings 23 and 24. This makes the tail fold, as before, but the operation then ceases because reversal of the position of valve 195 by knob 225 has cut off the air to valve 197 so that while the return of the tail folder has opened this latter valve (Figs. 6 and 7) no air can get to cylinder 43. Figs. 14 and 15 show two satisfactory ways of folding French cuffs, Fig. 14 being for a creased cuff and Fig. 15 for a flat cuff. To help hold the creased cuff in position until subsequently folded, there are provided two tabs 226 (Fig. 10) projecting from the table top through a hole 227 in each plate. The sleeve is arranged in a Z fold, the cuff folded over and the two stud holes slipped over their respective tabs. When the folding continues, upon reversal by the operator of valve 195 by means of knob 225, the plate will lift the cuff up off the holder tabs. For a flat fold the tabs 226 are not used, the cuffs being laid flat between the folding plates, the sleeves Z folded at the gusset portion, as seen in Fig. 15.

The actual manipulation by the operator, and the response of the apparatus, takes place rapidly as will appear when restated apart from the above operating detail. The operator spreads the shirt, with the collar easily falling around the collar form, and then presses the collar form control button 147. He moves wings 23 and 24 down to initiate the automatic operation. The shirt is folded practically instantaneously, whereupon he attaches the binding strip, steps on pedal 176 and removes the shirt. Reviewing the positions of the folding elements, the arms 25 and 26 are normally down and unfolded when idle, while the wings 23 and 24 are normally up and unfolded. When the wings are swung down and the pedal operated the whole folding assembly swings up. When the shirt is removed, and the foot taken from the pedal, the arms and wings unfold while elevated, and the arms then lower to the table to the idle position, ready for the next folding operation.

What I claim is:

1. Folding means of the character described comprising a folding table, an arm support tiltable on an axis fixed with respect to said table, a wing support also tiltable on an axis fixed with respect to said table, a right and a left folding arm having respective axes of swing carried by said arm support, a right and a left folding wing having respective axes of swing carried by said wing support, both the wing axes of swing and the arm axes of swing being disposed in a direction substantially at right angles to the aforesaid axes of tilt, means for tilting said wing support independently of said arm support, the axes of swing of said wings being spaced to permit said wings to swingably converge inwardly to superposed folded registry, and to diverge outwardly to unfolded position, the axes of swing of said arms being spaced to permit said arms to be swung inwardly to folded position substantially at the axes of swing of said wings.

2. Folding means of the character described comprising a folding table, an arm support tiltable on an axis fixed with respect to said table, a wing support also tiltable on an axis fixed with respect to said table, a right and a left folding arm having respective axes of swing carried by said arm support, a right and a left folding wing having respective axes of swing carried by said wing support, both the wing axes of swing and the arm axes of swing being disposed in a direction substantially at right angles to the aforesaid axes of tilt, means for tilting said wing support independently of said arm support, the axes of swing of said wings being spaced to permit said wings to swingably converge inwardly to superposed folded registry, and to diverge outwardly to unfolded position, the axes of swing of said arms being spaced to permit said arms to be swung inwardly to folded position substantially at the axes of swing of said wings, said arm support and said wing support having a common axis of tilt.

3. Folding means of the character described comprising a folding table, an arm support tiltable on an axis fixed with respect to said table, a wing support also tiltable on an axis fixed with respect to said table, a right and a left folding arm having respective axes of swing carried by said arm support, a right and a left folding wing having respective axes of swing carried by said wing support, both the wing axes of swing and the arm axes of swing being disposed in a direction substantially at right angles to the aforesaid axes of tilt, means for tilting said wing support independently of said arm support, the axes of swing of said wings being spaced to permit said wings to swingably converge inwardly to superposed folded registry, and to diverge outwardly to unfolded position, the axes of swing of said arms being spaced to permit said arms to be swung inwardly to folded position substantially at the axes of swing of said wings, said arm support and said wing support having a common axis of tilt and means for tilting said wing support upwardly responsive to upward tilting movement of said arm support.

4. Folding means of the character described comprising a folding table, a pair of spaced bearings fixed with respect to said table, a shaft rotatably carried in said bearings, a wing support fixed on said shaft so as to be tiltable with rotation of said shaft, an arm support freely mounted on said shaft, a pair of folding arms carried by said arm support, and each arm having an axis of swing on said arm support, a pair of folding wings carried by said wing support and each wing having an axis of swing on said wing support, means for swinging said wings inwardly to superposed folded registry and outwardly to unfolded position, means for swinging said arms inwardly to folded position wherein a part of each arm lies adjacent to the axis of swing of a respective wing, and for swinging said arms outwardly to unfolded position wherein a part of each arm lies outside and adjacent to the outer edge of a respective, unfolded wing, and means for controlling the sequence of folding swing of said arms and wings.

5. Folding means of the character described comprising a folding table, a pair of spaced bearings fixed with respect to said table, a shaft rotatably carried in said bearings, a wing support fixed on said shaft so as to be tiltable with rotation of said shaft, an arm support freely mounted on said shaft, a pair of folding arms carried by said arm support, and each arm having an axis of swing on said arm support, a pair of folding wings carried by said wing support and each wing having an axis of swing on said wing support, means for swinging said wings inwardly to superposed folded registry and outwardly to unfolded position, means for swinging said arms inwardly to folded position wherein a part of each arm lies adjacent to the axis of swing of a respective wing, and for swinging said arms outwardly to unfolded position wherein a part of each arm lies outside and adjacent to the outer edge of a respective, unfolded wing, and means for controlling the sequence of folding swing of said arms and wings, said last named means being adapted to produce swinging folding movement, in chronological sequence, first of one arm inwardly, then of the other arm inwardly, then of one wing inwardly to a position overlying the aforesaid arm parts, and then of the other wing inwardly to a position overlying the first wing and the aforesaid arm parts.

6. Folding means of the character described comprising a folding table, a pair of spaced bearings fixed with respect to said table, a shaft rotatably carried in said bearings, a wing support fixed on said shaft so as to be tiltable therewith, an arm support, journal means fixed to said arm support and freely tiltable on said shaft, a pair of folding wings having respective axes of swing on said wing support, a pair of folding arms having respective axes of swing on said arm support, the wing axes being spaced to permit the wings to swingably converge inwardly to superposed folded registry, and to diverge outwardly to unfolded position, the arm axes being spaced to permit the arms to be swung inwardly to folded position adjacent the wing axes, and outwardly to an unfolded position beyond said wings, a mounting plate fixed to and depending from said arm support and swingable between a first position wherein the arms are at table level to a second position wherein the arms are elevated, means carried by the frame, and biasing the mounting plate towards said second position, latch means for holding said mounting plate in said first position, and operator-operatable means for releasing said latch means to permit said biasing means to move said mounting plate to said second position.

7. Apparatus as defined in claim 6 wherein there is provided a power source and movable means energized by said power source and effective to operatively engage said arms and said wings to swing them first towards folded position, and then towards unfolded position.

8. Apparatus as defined in claim 7 wherein said movable means is disposed to engage first one arm, then a second arm, then one wing, and then a second wing, whereby to fold the said arms and wings sequentially, responsive to energization of said power source.

9. Apparatus as defined in claim 8 wherein means is provided for energizing said power source responsive to movement of said wing support downwardly.

10. Apparatus as defined in claim 6 wherein there is provided a tail folding blade, swingably mounted on an axis fixed with respect to said table, power means for swinging said blade from idle position to folding position, means for returning said blade to idle position, said power means being responsive to downward tilting movement of said wings so as to cause movement of said blade to folding position.

11. Apparatus as defined in claim 10 wherein there is provided hold-down means swingably mounted on said table and adapted by downward movement to retain a folded shirt tail, and means responsive to swinging movement of said folding blade to cause downward movement of said hold-down means, as aforesaid.

12. Folding means of the character described comprising a frame, a folding table carried on said frame, a pair of spaced bearings fixed with respect to said table, a shaft rotatably carried in said bearings, a wing support fixed on said shaft so as to be tiltable therewith, an arm support, journal means fixed to said arm support and freely tiltable on said shaft, a pair of folding wings having respective axes of swing on said wing support, a pair of folding arms having respective axes of swing on said arm support, the wing axes being spaced to permit the wings to swingably converge inwardly to superposed folded registry, and to diverge outwardly to unfolded position, the arm axes being spaced to permit the arms to be swung inwardly to folded position adjacent the wing axes, and outwardly to an unfolded position beyond said wings, a mounting plate fixed to and depending from said arm support and swingable between a first position wherein the arms, movable with said plate, are at table level and a second position wherein the arms are tilted at an angle to and above table level, spring means biasing said plate to said second position, latch means for holding said plate in first position, power means for moving said plate towards first position against spring bias when said power means is energized, operator-operatable means for releasing said latch means to permit said spring means to become effective, each said arm and each said wing having respective leverage means engageable therewith whereby said arms and wings may be individually swung between unfolded and folded positions, said mounting plate having movably mounted thereon four actuating devices, one such device engageable respectively with each said leverage means, whereby, upon movement of each such actuating device, the respectively engaged leverage means swings the engaged arm or wing to or from folded position, means for controlling the sequence of engagement of each such actuating device with the respective leverage means engaged thereby, and fluid power operated means carried on said mounting plate for moving said actuating devices.

13. Folding means of the character defined in claim 12, and provided with a tail folding blade swingable on said frame and having an idle and an operating position, power operated means for moving said blade to operating position, means for returning said blade to idle position, the fluid power operated means for moving the actuating device being responsive to return movement of said blade.

14. Folding means of the character described in claim 13, and provided with means, responsive to downward swing of the wing support, for initiating energization of the power operated means for the folding blade, whereby swinging movement of said blade to operating position immediately follows said downward swing of the wing support.

15. Folding means of the character described comprising a folding table, a shaft rotatable on bearings fixed with respect to said table, an arm support rotatably tiltable freely on said shaft, a wing support fixed to said shaft to rotate therewith through a limited arc, over-center toggle linkage having an end fixed to said shaft and another end to said frame to establish two rest positions for said shaft, a first position wherein said wing support is tilted upwardly from said table, and a second position wherein said wing support is adjacent the plane of the table, a right and a left folding arm hingedly attached to said arm support, a right and a left folding wing hingedly attached to said wing support, wing folding means for swinging said wings from an outstretched unfolded position to a folded position wherein said wings are superposed, arm folding means for swinging said arms from an unfolded position wherein they lie outwardly beyond said wings to a folded position wherein they lie adjacent the axis of swing of said wings, means for sequentially controlling the folding and unfolding movement of said arms and wings, a transverse folding blade, means for swinging said folding blade from an idle position to a folding position, means for returning said blade to idle position, means for causing folding movement of said folding blade responsive to movement of said wing support downwardly towards table level, means for energizing said arm folding means and said wing folding means to produce folding movement thereof responsive to return movement of said folding blade towards idle position, operator-operatable means for simultaneously tilting said arms and wings upwardly from said table with their respective arm and wing supports, and means responsive to release of said operator-operatable means for causing unfolding movement of said arms and wings, and for thereafter lowering said arm support and said arms to table level.

16. Folding means as defined in claim 15 including a collar form, means for normally contracting said form, means for expanding said form after a shirt collar is dressed thereon, and means responsive to operation of said operator-operatable means for releasing said form expanding means as said arms and wings tilt upwardly as aforesaid.

17. Folding means of the character described comprising a frame, a folding table carried by said frame, a wing support and an arm support carried by said frame, a right folding wing and a left folding wing having respective axes of swing spaced on said wing support to right and left of a center zone, a right folding arm and a left folding arm having respective axes of swing mounted on said arm support and spaced to right and left of the same center zone, the wing axes being disposed to permit the wings to swingably converge inwardly to superposed folded registry in said central zone, and to diverge outwardly to unfolded position, the arm axis of each arm being so disposed with respect to the adjacent wing, and the distance of the shirt-folding portion of the arm from its axis of swing being so dimensioned as to permit said arm to be swung inwardly to folded position substantially at the wing axis on the opposite side of said central zone, and outwardly to an unfolded position beyond the wing on its own side of said central zone, whereby, when said wings and arms are in unfolded position with the body portion of a shirt beneath said wings and with said arms beneath their respective shirt sleeves, sequential inward folding movement, first of said arms and then of said wings, folds the shirt longitudinally.

18. Folding means of the character described comprising a frame, a folding table carried by said frame, a wing support and an arm support carried by said frame, a right folding wing and a left folding wing having respective axes of swing spaced on said wing support to right and left of a central zone, a right folding arm and a left folding arm having respective axes of swing mounted on said arm support and spaced to right and left of the same central zone, the wing axes being spaced to permit the wings to swingably converge inwardly to superposed folded registry in said central zone and to diverge outwardly to unfolded position, the arm axis of each arm being so disposed with respect to the adjacent wing, and the distance of the shirt folding portion of the arm from its axis of swing being so dimensioned as to permit said arm to be swung inwardly to folded position substantially at the wing axis on the opposite side of said central zone, and outwardly to an unfolded position beyond the wing on its own side of said central zone, the wing and arm axes on the same side of the central zone being in substantial axial alignment longitudinally, when in folded position, a tail folding blade carried by said frame, means for swinging said blade on an axis transverse to the axes of swing of said wings and arms, from an idle position away from said arms and wings to a folding position adjacent said arms and wings, whereby, when said arms, wings, and blade are in idle unfolded position with a shirt having its body portion beneath said wings, its sleeves over said arms, and its tails over said blade, folding movement of said blade produces a transverse tail fold, and sequential folding movement first of said arms and then of said wings folds the shirt longitudinally.

19. Folding means of the character defined in claim 17 and including a collar form around which a shirt collar is adapted to be dressed, means normally effective to contract said collar form while in idle condition, means for expanding said form after a shirt collar is dressed thereon and for maintaining said collar form expanded while the arms and wings are performing a folding operation as aforesaid, and means for releasing said expanding means and permitting return of said form to contracted condition upon completion of the folding operation.

EDMUND N. NECKEL.

REFERENCES CITED

The following references are of record in the file of this patent:

UNITED STATES PATENTS

| Number | Name | Date |
|---|---|---|
| 2,152,940 | Wiegman | Apr. 4, 1939 |
| 2,285,063 | Steele | June 2, 1942 |
| 2,305,359 | Steele | Dec. 15, 1942 |
| 2,362,976 | Cooper | Nov. 21, 1944 |
| 2,556,079 | Gayring | June 5, 1951 |